United States Patent [19]

Weiss et al.

[11] Patent Number: 4,656,039
[45] Date of Patent: Apr. 7, 1987

[54] LAYERED CHEWING GUM WITH MOISTURE IMPERVIOUS OUTER LAYER

[75] Inventors: Gilbert Weiss, Stamford, Conn.; Ronald P. D'Amelia, Hicksville, N.Y.; Richard A. Reggio, Yorktown Heights, N.Y.; Stephen H. Wolf, Rye, N.Y.

[73] Assignee: Nabisco Brands, Inc., Parsippany, N.J.

[21] Appl. No.: 754,363

[22] Filed: Jul. 11, 1985

[51] Int. Cl.⁴ .............................................. A23G 3/30
[52] U.S. Cl. ....................................... 426/5; 426/548; 426/804
[58] Field of Search .................. 426/5, 3, 4, 6, 660, 426/548, 804

[56] References Cited

U.S. PATENT DOCUMENTS

| 810,210 | 1/1906 | Laws | 426/5 |
| 1,193,423 | 8/1916 | Pryor | 426/5 |
| 1,267,320 | 5/1918 | Fries | 426/5 |
| 1,771,506 | 7/1930 | Mustin | 426/5 |
| 1,771,981 | 7/1930 | Mustin | 426/5 |
| 1,771,982 | 7/1930 | Mustin | 426/5 |
| 1,786,606 | 12/1930 | Gordon | 426/5 |
| 2,304,246 | 12/1942 | Ekert | 426/5 |
| 2,604,056 | 7/1952 | Mahle | 426/5 |
| 3,208,405 | 9/1965 | Beer | 426/3 |
| 3,644,169 | 2/1972 | Phillips | 99/135 |
| 3,894,154 | 7/1975 | Graff et al. | 426/3 |
| 3,912,817 | 10/1975 | Sapsowitz | 426/5 |
| 4,139,589 | 2/1979 | Beringer et al. | 426/5 |
| 4,156,740 | 5/1979 | Glass et al. | 426/3 |
| 4,157,402 | 6/1979 | Ogawa et al. | 426/5 |
| 4,217,368 | 8/1980 | Witzel et al. | 426/5 |
| 4,269,860 | 5/1981 | Ogawa et al. | 426/5 |
| 4,352,825 | 10/1982 | Cherukuri et al. | 426/5 |
| 4,399,154 | 8/1983 | Puglia et al. | 426/5 |
| 4,452,821 | 6/1984 | Gergely | 426/5 |
| 4,513,012 | 4/1985 | Carroll et al. | 426/5 |

FOREIGN PATENT DOCUMENTS

| 2530421 | 1/1984 | France | 426/5 |
| 0198251 | 11/1983 | Japan | 426/5 |
| 0642846 | 5/1984 | Switzerland | 426/5 |

Primary Examiner—Jeanette Hunter
Attorney, Agent, or Firm—Richard Kornutik

[57] ABSTRACT

Chewing gum products are structured in layered form with all the water sensitive components of the formulation being placed in a core layer and encased in outer layers of water insensitive materials.

22 Claims, 7 Drawing Figures

4,656,039

LAYERED CHEWING GUM WITH MOISTURE IMPERVIOUS OUTER LAYER

BACKGROUND OF THE INVENTION

1. Field of the Invention

The present invention relates to chewing gum having a layered configuration wherein the outer layers are impervious to moisture and the inner layer contains all the formulated amounts of moisture sensitive components.

2. Description of the Prior Art

Chewing gum is made with various components such as L-aspartyl-L-phenylalanine methyl ester (aspartame or APM), an intense, artificial sweetener, and other flavorants, or combinations of components such as a food acid-$CaCO_3$ filler combination, which are sensitive to moisture. A premature exposure of such components to deleterious amounts of moisture in the chewing gum product during its manufacture and/or shelf life causes undesirable effects, ie., a loss of sweetening effect when the APM reacts with water, or a reaction between the food acid and the $CaCO_3$, or solvating effects on the stability of commonly used flavorants, such as fruit flavors.

The art has endeavored to meet the problems inherent in the use of these moisture sensitive materials in chewing gum products in various ways. In this regard it has been proposed, for example, to make the chewing gum under anhydrous conditions, as disclosed in U.S. Pat. No. 4,514,422; or to encapsulate, or fix, the APM or other moisture sensitive material, within a coating, encapsulating or absorbent material as disclosed, for example, in U.S. Pat. No. 4,384,004 and—PCT—International Patent Application WO 84/03201; or to otherwise formulate the chewing gum products in such a way that incompatible materials are either not used in a given formulation, or are maintained physically apart from each other therein, as disclosed, for example, in U.S. Pat. No. 4,374,858 wherein APM is placed on the outside or surface of the product.

In U.S. Pat. Nos. 1,771,981 and 1,771,982 there are disclosed various procedures and formulations for preparing layered chewing gum products. In each of these disclosures, however, the outer layers of the products are all formulated with moisture sensitive components, and, as such, such outer layers and ultimately, the unprotected inner layers, are readily susceptible to attack by moisture in the atmosphere, in the absence of the product being manufactured under anhydrous conditions, and being then packaged and stored in moisture impervious packaging or coating means.

Chewing gum also normally has about 2 to about 6 weight % of moisture formulated into the product. The moisture is part of the components normally added to the chewing gum formulations. Unless the loss of this moisture is prevented during the shelf life of the product, the product will harden and stale upon aging. This staling has usually been prevented in the prior art, by one or two ways. In one way products having a normal moisture content formulated therein are packaged in water impermeable packages that prevents the loss of moisture therefrom. In another way the normal moisture content of the product is lowered to anhydrous levels, i.e., of less than 2% and the product is formulated with relatively large amounts of a softening agent such as glycerine or propylene glycol. See in this regard U.S. Pat. No. 4,514,422 and International Patent application—PCT—WO 84/01693. However, the use of high amounts of these softening agents, which are highly hygroscopic, causes the chewing gum products in which they are used to deliquesce under even normal humidity conditions unless they are packaged in water impermeable packaging means.

Prior to the present invention, therefore, it has not been thought possible or feasible in the chewing gum art to readily render moisture sensitive materials insensitive to moisture by only employing such materials in a layer of chewing gum which is not readily accessible to ambient moisture, or to moisture normally present in a chewing gum formulation.

It has also not been thought feasible to avoid staling or hardening of chewing gum unless the product is either made with a normal moisture content and packaged in water impermeable packaging means or is made with a very low moisture content and is formulated with a high level of hygroscopic softening agents.

An object of the present invention, therefore, is to provide a new means for protecting moisture sensitive components of chewing gum from premature exposure to moisture during the shelf life thereof.

A further object of the present invention is to provide such means without the need for the use of additional materials, such as coating, etc. materials, beyond those normally needed for the formulation of the chewing gum products themselves.

A still further object of the present invention is to provide a non-staling chewing gum which is capable of maintaining its formulated moisture content with a low or non-existent content of hygroscopic softening agents.

SUMMARY OF THE PRESENT INVENTION

According to the present invention, water sensitive components of chewing gum formulations can be readily rendered non-accessible to deleterious amounts of moisture by manufacturing the chewing gum so as to prepare it in the form of a layered product wherein all the moisture sensitive components of the chewing gum formulation are placed in one or more inner layers of the product which are in turn encased by two or more outer layers, which latter layers are composed of moisture impermeable and insensitive materials which are normal components of the chewing gum formulations.

The construction of the chewing gum product in this way also allows the outer moisture impervious layers of the product to prevent the loss, from the inner layers of the gum product, of any amounts of moisture formulated into the composition of such inner layers, as well as the gain of any amounts of moisture from the atmosphere.

DESCRIPTION OF THE PREFERRED EMBODIMENTS

The term moisture or water sensitive as used in the context of the present invention means being soluble in, or swellable by, or chemically reactive with, or hydratable by, moisture. A hygroscopic or hydrophilic material is also a water sensitive material, within the context of the present invention. The term moisture impermeable as used in the context of the present invention means being substantially to completely impervious to the passage of water vapor therethrough.

The chewing gum products of the present invention are prepared from one or more solid core layers which contain all the water sensitive components of the chewing gum products and two or more outer shell layers which do not contain any water sensitive materials and which are also moisture impermeable. The chewing gum products of the present invention may be made in stick or pillow type forms. Bubble gum products are usually made in the pillow type forms and regular (non-bubble) chewing gum is usually made in stick form. Stick type chewing gum products of the present invention are shown in FIGS. 1 to 7 of the drawings.

Figure 1:
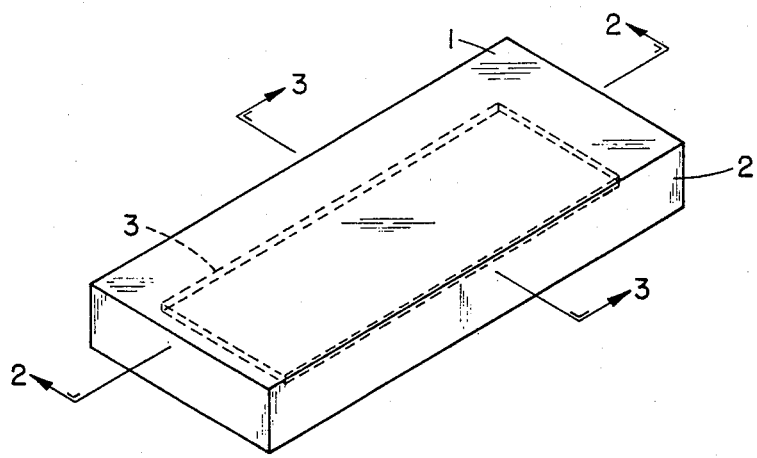
FIG. 1 of the drawings shows one embodiment of a chewing gum product of the present invention, in stick form.

FIG. 1 shows one embodiment of the chewing gum products of the present invention, a stick of gum 1 wherein shell layer 2 thereof completely encases a core layer 3. Shell 2, as shown in FIGS. 2 and 3, is essentially comprised of an upper shell layer 2a and a lower shell layer 2b.

Figure 2:
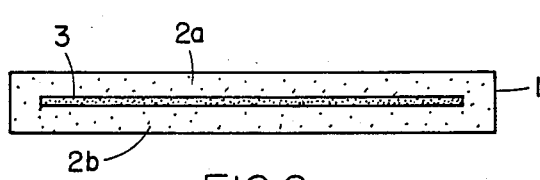
FIG. 2 of the drawings shows a side or longitudinal view of the FIG. 1 product through section 2—2 thereof, and FIG. 3 of the drawings shows a transverse view of the FIG. 1 product through section 3—3 thereof.

FIG. 2 shows a side or longitudinal view of the stick product 1 of FIG. 1 through section 2—2 thereof, wherein core layer 3 is completely encased by upper shell layer 2a and lower shell layer 2b.

Figure 3:
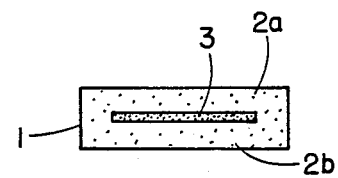

FIG. 3 shows a transverse view of the stick product of FIG. 1 through section 3—3 thereof. FIGS. 1 to 3 thus show a stick gum product in which shell layers 2a and 2b, which are essentially devoid of moisture sensitive components, completely encase core layer 3 which comprises one or more moisture sensitive materials, as described in more detail hereinafter.

Figure 4:
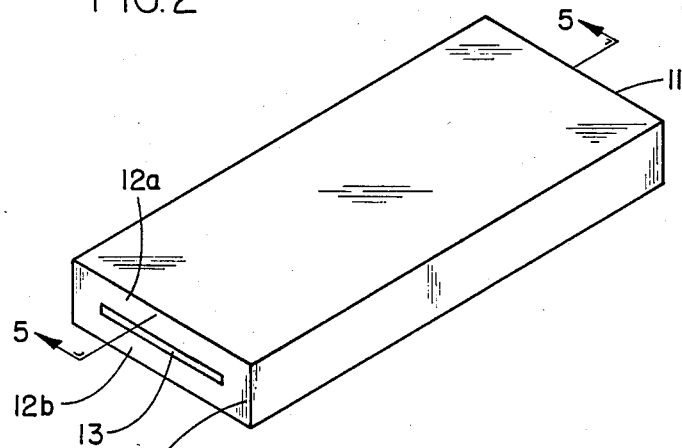
FIG. 4 shows a second embodiment of a chewing gum product of the present invention, in stick form.

FIG. 4 shows a second embodiment of the chewing gum products of the present invention, a stick of gum 11 wherein upper shell layer 12a and lower shell layer 12b substantially encase a core layer 13, i.e., except at the ends 14a and 14b thereof.

Figure 5:
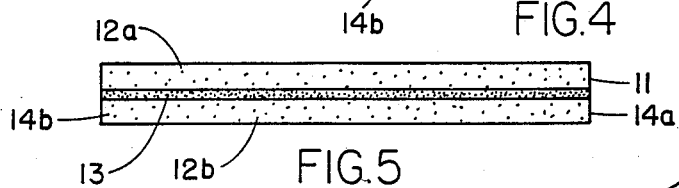
FIG. 5 shows a side or longitudinal view of the FIG. 4 product through section 5—5 thereof.

FIG. 5 shows a side or longitudinal view of the stick product 11 of FIG. 4 through section 5—5 thereof.

Figure 7:
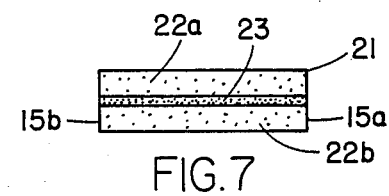
FIG. 7 shows a transverse view of the FIG. 6 product through section 7—7 thereof.
Figure 6:
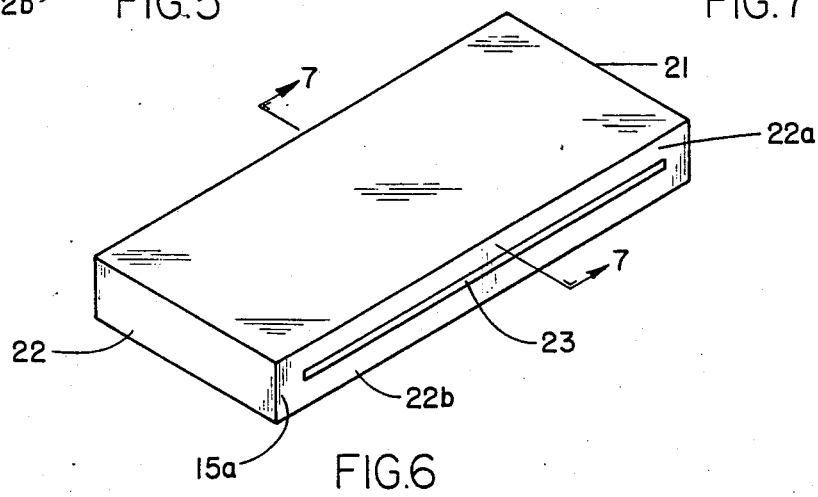
FIG. 6 shows a third embodiment of a chewing gum product of the present invention, in stick form.

FIG. 6 shows a third embodiment of the chewing gum products of the present invention, a stick of gum 21 wherein shell 22, which is composed of upper shell layer 22a and lower shell layer 22b, substantially encase a core layer 23, i.e., except at the sides 15a and 15b thereof. FIG. 7 shows a transverse view of the stick product 21 of FIG. 6 through section 7—7 thereof. The core layer of the products of the present invention may thus extend continuously through the length, as shown in FIGS. 4 and 5, or width, as shown in FIGS. 6 and 7, of such chewing gum product. The core layer may also extend continuously through both the length and width of such products, or extend discontinuously through said width and/or length.

The chewing gum products may thus have only the ends or sides of the core layers exposed as shown in FIGS. 4/5 and 6/7, respectively, or such ends and sides may both be exposed. In any of such cases the upper and lower shell layers would still substantially enclose or encase the core layer since the amount of exposed surface at the ends and/or sides of the core layer in such cases would be very small as compared to the extent or amount of the surfaces of the core layer that would be completely covered or enclosed.

The inner core layers of the chewing gum products of the present invention contain all the moisture soluble or sensitive materials which are normally formulated into chewing gum products such as the sweetener materials including aspartame, water swellable or absorbing gums and hygroscopic material such as glycerine and propylene glycol.

The core layer is not a liquid filled layer. The core layer can, however, have any solid configuration. This core layer can be a solid, slab-like layer of a chewing gum composition which contains all of the water sensitive materials therein, or it can be of a powdery or particulate composition containing one or more components, but including all of the water sensitive materials intended for the formulation of the entire product. Upon mastication of the product, all of the components of the center layers of the product will obviously become commingled and admixed with all of the components of the outer or shell layers of the product.

The layering of the chewing gum products of the present invention can be done with slab layering type equipment as is shown for example in U.S. Pat. Nos. 1,771,981 and 1,771,982 or in coextrusion equipment known in the art for making coextruded chewing gum products.

Thus, each core layer may be used in the form of a pliable strip, rope, film or layer of material that can be readily handled in conventional stick or pillow forming chewing gum processes. Particulate or liquid moisture sensitive materials can be readily formulated into such pliable strip, etc., configurations by being compounded with conventional components of chewing gum formulations as disclosed below.

After the laminated products are made, and it is desired to seal the ends and/or sides of the products by having the outer layers enclose the ends and/or sides of the inner core layer, this may be done by various procedures such as by crimping the ends and/or sides of the laminated product together, or by folding and sealing intended areas of the upper layer down over the ends and/or sides of core layer. Any exposed ends or sides of the core layer may also be readily coated with a moisture impervious sealant material such as shellac.

GUM BASE

The composition of the gum base material which is employed as the shell layers in the chewing gum compositions of the present invention will vary depending on whether the gum base is to be used in a chewing gum product which is to be a regular, or non-bubble, gum product or a bubble gum product. The gum base material will comprise, as noted above, only materials which are not water sensitive. They will not include hydrophilic materials. The gum base materials need only comprise, as the minimum components thereof, one or more elastomers and one or more plasticizers for such elastomers. Other, optional, water insensitive materials that may be used in the gum base composition would include one or more waxes, one or more mineral fillers, one or more hydrogenated fats, one or more antioxidants and one or more flavorants.

Where mineral fillers are used in the outer layers, they should not be used in such amounts as would cause the outer layer to become porous enough as to become water permeable. They should thus be used in non-water transmitting amounts. These amounts will vary depending on the size and shape of the filler particles being used and would include amounts in the range of about 0 to 10% and preferably of about 2 to 8%. For use in making a bubble gum or regular chewing gum product, the following gum base formulations may be used, therefore, in accordance with the present invention:

| | WEIGHT % OF COMPONENT IN GUM BASE FOR SHELL LAYERS | | | |
|---|---|---|---|---|
| | BUBBLE GUM PRODUCT | | REGULAR GUM PRODUCT | |
| COMPONENT | Broad Range | Preferred Range | Broad Range | Preferred Range |
| masticatory material | 8-25 | 10-20 | 9-40 | 10-30 |
| plasticizer for masticatory material | 10-75 | 20-60 | 10-60 | 20-50 |
| wax | 0-15 | 5-12 | 0-20 | 8-15 |
| mineral filler | 0-10 | 2-8 | 0-10 | 2-8 |
| softening agent | 0-8 | 1-7 | 0-8 | 1-7 |
| antioxidant | 0-0.1 | 0.05-0.09 | 0-0.1 | 0.03-0.09 |
| total | 100 | 100 | 100 | 100 |

The masticatory substances are elastomeric materials which may be synthetic or natural in origin. The masticatory substances of synthetic origin would include styrene-butadiene copolymer, butyl rubber (which is isobutylene-isoprenet copolymer) and polyisobutylene. The natural masticatory substances would include chicle, crown gum, nispero, balata, jetulong, pendare, perillo, niger gutta, tunic, leche caspi, sorva and gutta hank kang.

The plasticizer for the masticatory substance will preferably comprise a hydrogenated ester gum, that is a glycerol ester of hydrogenated resin and/or dimerized ester gum. However, other resins may be employed such as pentaerythritol ester gum, polymerized ester gum, polyterpene resin and ester gum.

The waxes which are used serve primarily as compatibilizers. Examples of appropriate waxes are petroleum waxes such as paraffin wax, candelilla wax, carnauba wax, microcrystalline waxes, bees' wax and polyethylene waxes.

The mineral fillers would include calcium carbonate, titanium dioxide, talc, alumina, di- and tricalcium phosphate and mixtures thereof.

The gum base may also include a softening agent and lubricant combination which may comprise one or more hydrogenated vegetable or mineral fats, triacetin, acetylated fatty acid glycerides, lanolin, stearic acid, glyceryl monostearate, cocoa butter and hydrogenated methyl ester of rosin.

In addition, the gum base may include antioxidants such as butylated hydroxy toluene, butylated hydroxy anisole and propyl gallate.

The gum base should be devoid of materials that may impart any hydrophilic properties or hygroscopic properties to the gum base, such as emulsifiers such as the phosphatides, or hygroscopic softeners such as glycerine and propylene glycol.

The Core Material

The core material contains all the various components of the chewing gum formulation which are water sensitive in nature and including the sweetening agents, plasticizers or softening agents such as glycerine and propylene glycol, emulsifiers such as the phosphatides such as lecithin; and hydrophilic type detackifiers such as various vinyl polymers such as polyvinyl alcohol and polyvinyl acetate, hydrocolloid gums such as methyl cellulose, alginates, carrageenan, xanthan gum, gelatin, carob, tragacanth, locust bean and cellulose materials such as carboxy methyl cellulose.

The core material may also contain one or more flavorings, colorants, antioxidants and preservatives.

The outer layers of the chewing gum products of the present invention need not contain all of the product's intended gum base content. The outer layers need only contain such amounts of the gum base as are needed to substantially to completely encase the inner layers of the product with a water impermeable outer coating. The remainder of the amount of the gum base needed for the formulation of the entire product can be formulated with all the intended components of the inner layers. The amount of the gum base needed to thus encase the inner layer of the product would depend on the configuration of the product, i.e., stick vs pillow, and the desired thickness for the outer coating layers.

As disclosed in U.S. Pat. No. 4,513,012 the core layer need only contain, basically, a powdered centerfill such as a flavoring agent, such as a dry sweetener such as an intense sweetener such as aspartame, or a cyclamate based compound, or a saccharin based compound, or sucrose, or a mixture of such sweetening agents. Such a powdered center fill may also contain one or more flavors, acidulents, lubricants, fillers and colors, as noted in U.S. Pat. No. 4,513,012. Where the core layer is thus to contain only such types of powdered additives they need not be formulated with any of the gum base.

Where a powdered centerfill is used it may be applied discontinuously as a core layer in the products of the present invention, or such powder containing core layer may also be completely enclosed by the upper and lower shell layers as discussed above. A powdered core layer may also be used that is substantially enclosed by the upper and lower shell layers as disclosed above, and is thus exposed at the ends and/or sides of the resulting products, where the powdered core layer is so impressed into the upper and/or lower shell layers during the manufacture of the product as to prevent any significant losses of the powdered layer, out through the ends and/or sides of the resulting products, during the manufacture, packaging, and storage of such products.

However, in order to place the water sensitive components of the core material into a form in which they may be more readily handled and processed in the available chewing gum making equipment they may be formed into a sheet or solid layer type configuration after being formulated into a chewing gum product with gum base components. The formulations which may be used in this regard will comprise the gum base and one or more other materials, as follows:

| | Weight Percent of Component | |
|---|---|---|
| Component | Broad Range | Preferred Range |
| gum base | 15 to 95 | 20 to 30 |
| bulk sweetener | 0.0 to 90 | 20 to 70 |

-continued

| Component | Weight Percent of Component | |
|---|---|---|
| | Broad Range | Preferred Range |
| intense sweetener | 0.1 to 3 | 0.1 to 0.25 |
| plasticizer | 0 to 30 | 5 to 15 |
| filler | 0 to 35 | 5 to 30 |
| emulsifier | 0 to 2.0 | 0.2 to 1.0 |
| hygroscopic softening agent | 0 to 12 | 5 to 8 |
| hydrocolloid gum | 0 to 2.0 | 0 to 0.70 |
| coloring agent | 0.1 to 0.5 | 0.15 to 0.3 |
| flavoring agent | 0.1 to 2.5 | 0.3 to 1.2 |
| | 100 | 100 |

The chewing gum compositions to be used as the core layers of the chewing gum products of the present invention can be sugar based or sugarless. A blend of sugar and sugarless sweetener may also be used. Where a sugar is used the sweetener will comprise one or more of sucrose, dextrose, invert sugar, glucose or corn syrup and fructose.

Where a sugarless product is desired, one or more sugar substitutes may be used such as sugar alcohols e.g. sorbitol, sorbitol syrup, mannitol and xylitol, and hydrogenated starch hydrolysate. These materials are used, as are the sugar type sweeteners, as bulk sweeteners, in an amount of about 0 to 90, and preferably about 20 to 70, % by weight of the core layer formulation.

The sugarless products may also be made with one or more non-nutritive or artificial or intense sweeteners such as poorly water-soluble, as well as water-soluble, sweeteners, such as the free acid form of saccharin, sodium, calcium or ammonium saccharin salts, dihydrochalcones, glycyrrhizin, dipotassium, glycyrrhizin, glycyrrhizic acid/ammonium salt, talin, acesulfame K, as well as *Stevia rebandianna* (Stevioside), *Richardella dulcifica* (Miracle Berry), *Dioscoreophylium cumminisu* (Serendipity Berry), free cyclamic acid and cyclamate salts and the like or mixtures of any two or more of the above.

In addition to the above, the chewing gum made by this invention can also contain conventional FD&C and natural coloring agents.

The flavoring which can be included in the chewing gum compositions made according to this invention can comprise one or more natural and/or synthetic flavors and/or oils derived from plants, leaves, flowers and fruit.

Representative flavors and oils of these types include acids such as adipic, succinic and fumaric acid; citrus oils such as lemon oil, organic oil, lime oil and grapefruit oil; fruit essences, such as apple essence, pear essence, peach essence, strawberry essence, apricot essence, raspberry essence, cherry essence, plum essence and pineapple essence; essential oils such as peppermint oil, spearmint oil, mixtures of peppermint oil and spearmint oil, clove oil, bay oil, anise oil, oil of nutmeg, oil of sage, oil of butter almonds, cassia oil and methylsalicylate (oil of wintergreen). Various synthetic flavors, such as those for a mixed fruit, may also be incorporated in the chewing gum with or without conventional preservatives.

Preparation of Chewing Gum Product

The chewing gum products of the present invention are preferably prepared by first separately preparing a gum base composition, as described above, which does not contain any water sensitive materials. All, or a portion, of such gum base can then be used, as is, to form the outer, water impermeable, layers of the chewing gum products of the present invention.

The remaining portion, if any, of the gum base composition can then be admixed with the other desired components of the chewing gum composition, including all of the water sensitive materials, to form the core layer of the chewing gum products of the present invention.

To thus prepare either a sugar based or sugarless chewing gum formulation for the center layer, the gum base, where used in such formulation, is melted, at a temperature of about 160° to 270° F., and the other components of the core layer formulation are added thereto.

The resulting composition is uniformly admixed. This takes about 3 to 7 minutes for commercial sized batches of these formulations. Each of the components is usually separately added to the formulated composition and uniformly mixed in before the next component is added. All of the admixing operations are conducted at temperatures in the range of about 115° to 185° F., and preferably of about 125° to 180° F. for a total mixing time, at such temperatures, of about 10 to 20 minutes. These operations do not have to be conducted under anhydrous conditions in preparing either the core layer or the outer layer compositions of the present invention, and any amounts of moisture that are normally present in the raw materials that are used in the compositions of the present invention do not usually have to be removed therefrom either prior to, or during, the formulating process. The one exception to this concept of not removing water occurs when using rubber latices as in the source of the masticatory substances that are used in making the gum base compositions. As in prior art practice, the moisture content of such latices is, essentially, normally removed after coagulation of the latex. None of the other components of the gum base compositions of the present invention normally have any measurable water content.

The chewing gum formulations disclosed herein may thus be prepared, and processed into chewing gum products, using conventional chewing gum formulation mixing, processing and packaging equipment and concepts, as discussed above.

Although the outer core layers of the products of the present invention do not have any moisture sensitive materials formulated into such layers, commonly employed dusting materials, which may be water sensitive, such as sugar, starch or mannitol may be applied to the outer surfaces of the products of the present invention to prevent surface adhesion during the manufacturing and handling thereof.

The following examples are merely illustrative of the present invention and are not intended as a limitation upon the scope thereof. In the formulations disclosed in these examples all percents are percents by weight.

EXAMPLE I

The following is a formulation that may be used, as described above, as a shell layer or gum base in a bubble gum product of the present invention.

| Component of Formulation | % of Component |
|---|---|
| Styrene-butadiene copolymer (NDE 1028 Plioflex)++ | 10 |
| Polyisobutylene | 5 |
| Glycerol ester of partially | 59.9 |

-continued

| Component of Formulation | % of Component |
|---|---|
| hydrogenated rosin *Hydrogenated methyl ester of rosin | 10 |
| Paraffin Wax | 6 |
| Microcrystalline wax | 7 |
| Acetylated blend of fatty acid monoglycerides with 50-90% acetyl content | 2 |
| Antioxidant | 0.1 |
| | 100 |

*This is a resinous plasticizer and it is insoluble in water.
++Tradename (Plioflex) of Goodyear Rubber Co.

EXAMPLE 2

The following is a formulation that may be used, as described above, as a shell layer or gum base in a regular gum product of the present invention.

| Component of Formulation | % of Component |
|---|---|
| Styrene-Butadiene co-polymer (Plioflex 1027 type) | 12 |
| Glycerol ester of partially hydrogenated wood rosin | 59.9 |
| Paraffin Wax | 7 |
| Microcrystalline wax | 3 |
| Hydrogenated methyl ester of rosin | 5 |
| Acetylated blend of fatty acid monoglycerides with 50-90% acetyl content | 5 |
| Calcium Carbonate | 8.0 |
| Antioxidant | 0.1 |
| | 100.00 |

EXAMPLE 3

The following is another formulation that may be used, as described above, as a shell layer or gum base in a regular product of the present invention:

| Component of Formulation | % of component |
|---|---|
| Chicle | 10 |
| Butyl Rubber | 4 |
| Paraffin wax | 13 |
| Microcrystalline wax | 13 |
| Glycerol ester of polymerized rosin | 39.9 |
| Calcium Carbonate | 8 |
| Acetylated blend of fatty acid monoglycerides with 50-90% acetyl content | 7 |
| Glyceryl monostearate | 5 |
| Antioxidant | 0.1 |
| | 100.0 |

EXAMPLES 4 to 6

The following are formulations that may be used, as described above, as gum base containing core layers in sugarless chewing gum products. The gum bases used in these products may be any one of those of Examples 1 and 3 above, or others. The resulting products may thus be regular or bubble gum products, depending on the type of gum base employed therein. In the formulation of Examples 4 to 6 various intense sweeteners are used in combination with specified sugar alcohols (sorbitol and mannitol or xylitol) and hydrogenated starch hydrolysate as bulk sweeteners.

| | % of Component Example | | |
|---|---|---|---|
| Component of Formulation | 4 | 5 | 6 |
| Gum Base | 27.0 | 30.0 | 27.0 |
| Sorbitol | 54.7 | 47.3 | 50.0 |
| xylitol | — | — | 5.0 |
| mannitol | 8.0 | 10.0 | — |
| Hydrogenated Starch Hydrolysate | — | — | 13.0 |
| Sodium Saccharin | 0.2 | — | — |
| APM | — | 0.35 | — |
| Acesulfame K | — | — | 0.2 |
| Soya Lecithin | 0.8 | .85 | .6 |
| Glycerine | 8.0 | 10.0 | 3.0 |
| Peppermint Oil | 1.3 | — | 1.2 |
| Cherry Flavor (Artificial) | — | 1.5 | — |
| | 100.0 | 100.0 | 100.0 |

EXAMPLE 7-8

The following are formulations that may be used, as described above, as gum base containing core layers in sugar based chewing gum products. The gum bases used in these products may be any one of those of Examples 1 to 3 above, or others. The resulting products may thus be regular or bubble gum products, depending on the type of gum base employed therein. In the formulations of Examples 7 and 8, selected combinations of flavors and coloring agents are used.

| | % of Component Example | |
|---|---|---|
| Component of Formulation | 7 | 8 |
| Gum Base | 21.0 | 19.0 |
| Sucrose | 57.5 | 57.8 |
| Dextrose (Crystalline) | 6.0 | 5.0 |
| Corn Syrup | 14.0 | 16.0 |
| Soya Lecithin | 0.5 | 0.2 |
| Glycerine | — | 0.3 |
| Coloring Agent | — | 0.1 |
| Flavor (Peppermint Oil) | 1.0 | — |
| Flavor (Mixed Fruit) | — | 1.6 |
| | 100.0 | 100.0 |

Chewing gum products may thus be prepared with one or more of the shell layers of Examples 1 to 3 in combination with a core layer of Examples 4 to 8, or a core layer formed from an individual powdered component, as otherwise described above.

What is claimed is:

1. A chewing gum product comprising at least one outer layer of gum base rich material which is essentially devoid of moisture sensitive components and which substantially to completely encloses a solid core structure comprising one or more moisture sensitive materials.

2. A chewing gum product as in claim 1 wherein said outer layer is a chewing gum base formulated from masticatory material, plasticizer for said masticatory material and, optionally, wax, mineral filler and antioxidant.

3. A chewing gum product as in claim 2 wherein said core structure is formulated with components selected from the group consisting of gum base, sweeteners, fillers, plasticizers, emulsifiers and hydrocolloid gums.

4. A chewing gum product as in claim 3 which is a sugarless product.

5. A chewing gum product as in claim 3 which is a sugar based product.

6. A chewing gum product as in claim 3 which is a bubble gum product.

7. A chewing gum product as in claim 3 which is a regular chewing gum product.

8. A chewing gum product as in claim 6 which is in pillow form.

9. A chewing gum product as in claim 7 which is in stick form.

10. A stick chewing gum product having a multilayered configuration wherein two solid outer layers of an essentially water impermeable or water insensitive composition substantially to completely enclose one or more solid inner layers which comprise significant amounts of one or more water sensitive components.

11. A stick chewing gum product as in claim 1 wherein said outer layers comprise an elastomeric gum base.

12. A stick chewing gum product as in claim 2 wherein at least one of said inner layers contains aspartame.

13. A chewing gum product as in claim 1 having a moisture content of more than 2 to about 6 weight percent.

14. A chewing gum product as in claim 13 containing up to about 12 weight % of hygroscopic softening agent.

15. A chewing gum product as in claim 14 in which said hygroscopic softening agents are selected from the group consisting of glycerine and propylene glycol.

16. A chewing gum product as in claim 15 in which said hygroscopic softening agent is glycerine.

17. A chewing gum product as in claim 16 in which up to about 10% of said glycerine is employed.

18. A chewing gum product as in claim 14 in which 0% of said hygroscopic softening agent is employed.

19. A chewing gum product as in claim 1 in which said core structure is completely enclosed.

20. A chewing gum product as in claim 1 in which said core structure is substantially enclosed.

21. A stick chewing gum product as in claim 10 in which said inner layers are completely enclosed.

22. A stick chewing gum product as in claim 10 in which said inner layers are substantially enclosed.

* * * * *